United States Patent [19]
Owens

[11] 4,031,505
[45] June 21, 1977

[54] SEISMIC SYSTEM WITH SIGNAL-TO-NOISE DETERMINATION

[75] Inventor: Gary D. Owens, Bellaire, Tex.
[73] Assignee: Texaco Inc., New York, N.Y.
[22] Filed: Mar. 24, 1976
[21] Appl. No.: 669,774
[52] U.S. Cl. .................... 340/15.5 DP; 340/15.5 A; 340/15.5 GC; 238/92 SH; 328/135; 328/148; 307/351; 307/352
[51] Int. Cl.² ........................................ G01V 1/28
[58] Field of Search ............ 340/15.5 GC, 15.5 DP, 340/15.5 AC, 15.5 A, 15.5 AP; 235/92 CA, 92 SH; 307/235 A, 235 B; 328/135, 147, 148, 151

[56] References Cited
UNITED STATES PATENTS

| | | | |
|---|---|---|---|
| 3,506,813 | 4/1970 | Trimble | 340/15.5 GC |
| 3,585,507 | 6/1971 | Bickel | 328/148 |
| 3,789,306 | 1/1974 | Hammerschlag | 325/135 |

Primary Examiner—Howard A. Birmiel
Attorney, Agent, or Firm—Thomas H. Whaley; Carl G. Ries; Ronald G. Gillespie

[57] ABSTRACT

An improvement to a seismic system, which provides data words, having digital signals corresponding to sensed vibrations in an earth formation or to noise occurring in a seismic system, permits the determination of the signal to noise ratio of the seismic system in the field. The improvement comprises a new word register receiving the data word signals from the seismic system, an H register and an L register. The improvement also includes control circuits and comparators whereby the comparators and the registers are controlled so that the data word is periodically entered into a new word register and the signals provided by the new word register is compared with signals provided by the H register and the L register so that after one cycle of operation, the most positive data word occurring during the cycle is stored in either the H or L register while the most negative data word occurring is stored in the remaining register of the H and L registers. A digital subtractor subtracts the H and L register contents from each other to provide an output corresponding to the absolute difference between the words stored in the H and L register. A logic network provides digital signals corresponding to the signal to noise ratio in decibels. A visual display is provided of the signal to noise ratio.

10 Claims, 8 Drawing Figures

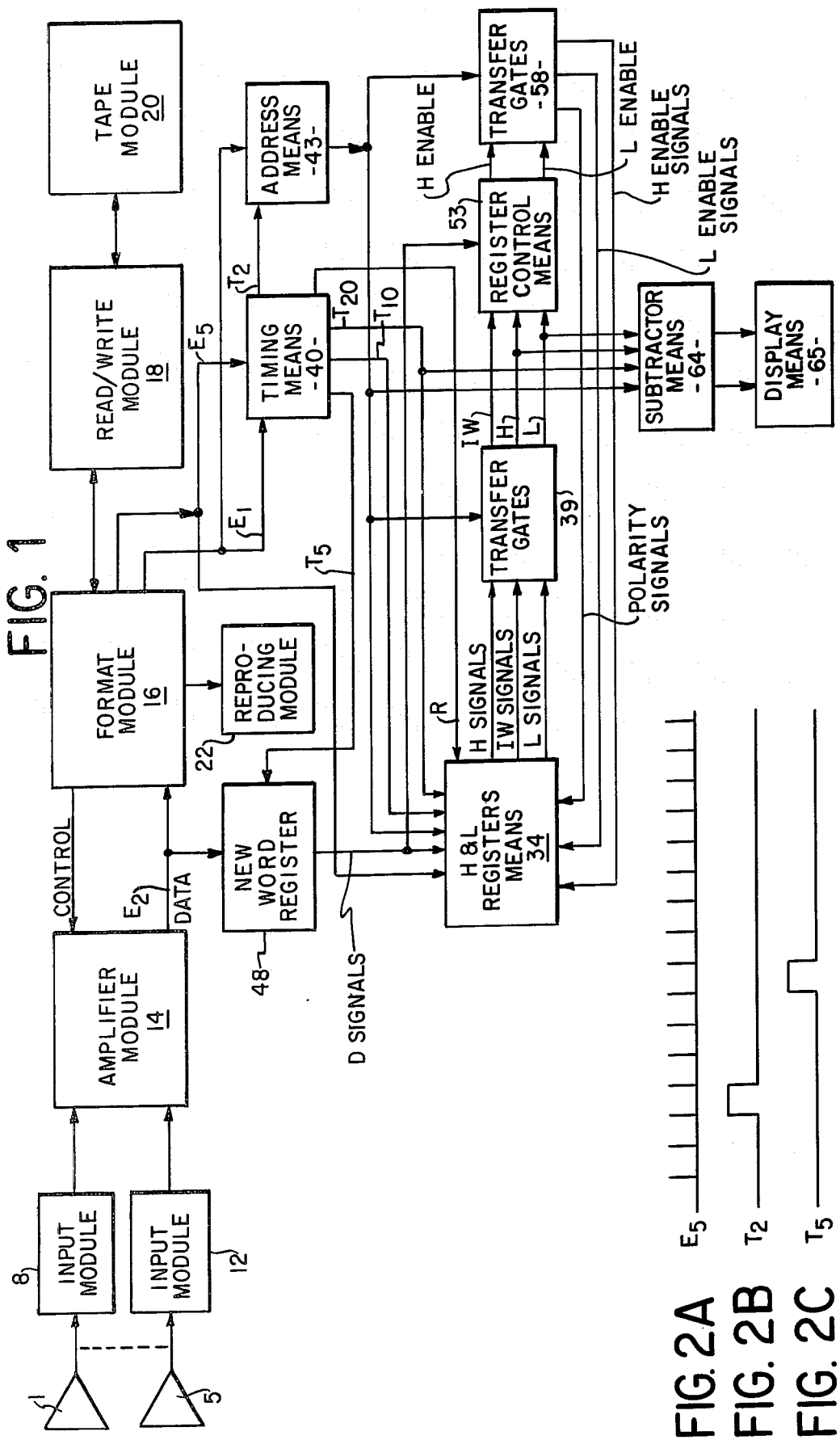
FIG. 1
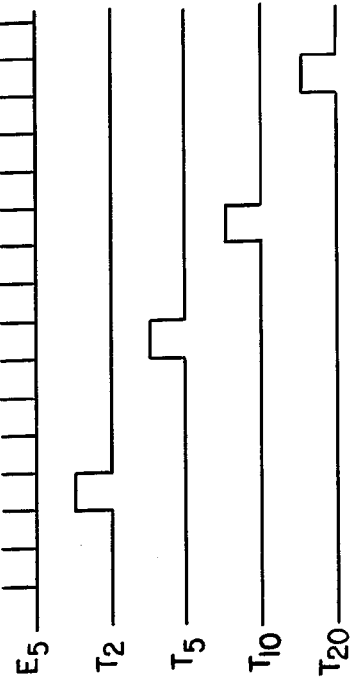
FIG. 2A  $E_5$
FIG. 2B  $T_2$
FIG. 2C  $T_5$
FIG. 2D  $T_{10}$
FIG. 2E  $T_{20}$ 4,031,505

SEISMIC SYSTEM WITH SIGNAL-TO-NOISE DETERMINATION

BACKGROUND OF THE INVENTION

1. Field of the Invention

The present invention relates to seismic systems in general and, more particularly, to signal to noise determination for seismic systems.

2. Description of the Prior Art

One of the most important steps in the inspection of a digital field recording system is the determination of its signal to noise ratio. Heretofore the best aid in the determination of the signal to noise ratio involved the use of a centrally located general purpose computer. A record is recorded on digital tape by the recording system noise at minimum system gain. The minimum gain word is then submitted to the computer where the five most positive digital numbers and the five most negative digital numbers of each tape channel are printed on a computer paper print out. To determine the signal to noise ratio, the difference between the most positive and the most negative digital numbers must be taken for each channel. This difference is compared to values in a reference table. The signal to noise ratio is then determined from the table. The biggest disadvantage to this aid is the computer turn around time. If the system to be inspected is tested at the computer processing center it will take one to two days to determine the signal to noise ratio. If the system is in the field, the records must be brought back to the computer center and a minimum of three of four days is needed to determine the signal to noise ratio.

Another aid is called a noise decoder. The noise decoder must be used with an oscilloscope. The output of the noise decoder is not the signal to noise ratio but converter bits from which an approximate signal to noise ratio can be derived. The main disadvantage is that the exact signal to noise ratio cannot be found easily if at all. The reason for this is that the output of the noise decoder displays all changes serially across the oscilloscope screen without capturing the most positive or most negative words. It is possible that a noise spike can occur that the scope observer can miss with his eye.

The present invention provides for on-site signal to noise ratio determination for each channel in a seismic system.

SUMMARY OF THE INVENTION

An improvement to a seismic system, which provides a data word having digital signals corresponding to sensed vibrations in an earth formation and with noise occurring in the seismic system, permits the determination of the signal to noise ratio of the seismic system while in the field. The data word digital signals include a sign signal corresponding to a positive or a negative polarity of the data word while the remaining data word digital signals correspond to the absolute value of the sensed vibration or the noise. The improvement comprises a sampling circuit which periodically samples the data word and provides a signal corresponding to a sample data word. A storing circuit stores the most positive sample with respect to the samples provided by the sampling circuit and the most negative sample with respect to the samples provided by the sampling circuit. An output circuit connected to the storing circuit provides a digital output corresponding to the absolute difference between the stored most positive sample and the stored most negative sample.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be construed as defining the limits of the invention.

DESCRIPTION OF THE DRAWINGS

FIG. 1 is a simplified block diagram of the seismic system with an improvement, constructed in accordance with the present invention, for displaying the signal to noise ratio of the seismic system.

FIGS. 2A through 2E are graphical representations of voltages occurring during the operation of the seismic system improvement shown in FIG. 1.

DESCRIPTION OF THE INVENTION

Figure 3:
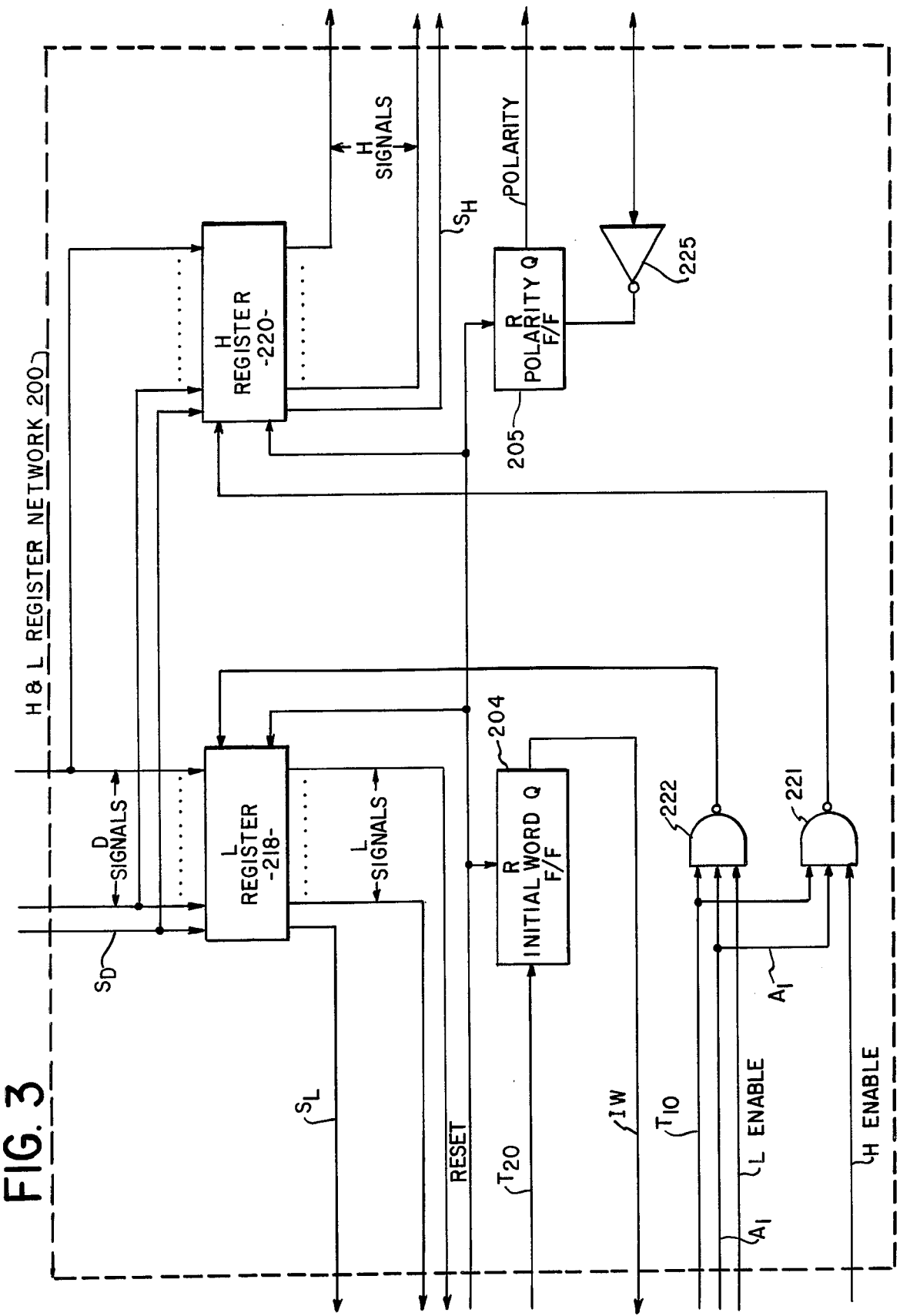
FIG. 3 is a detailed block diagram of an H & L register network which is part of the H and L register means shown in FIG. 1.

Referring to FIG. 1, there is shown a system for determining the signal to noise ratio for a field digital recording system. Typically, geophones 1 and 5 will pick up vibrations which are induced in an earth formation and provide them to input modules 8 and 12. It is to be understood that although only two geophones and input modules are shown for convenience of explanation any number of geophones and input modules may be used. Input modules 8, 12 amplify the signals from geophones 1 and 5, respectively, and provide them to an amplifying module 14. Amplifying module 14 receives control signals from format module 16 and provides data signals to formal module 16. It should be noted that amplifier module 14, format module 16, read/write module 18, tape module 20 and reproducing module 22 are part of a conventional type digital seismic system which by way of example may be Texas Instrument Digital Field System DFS-IV. The present invention provides for an on-site read out of the signal to noise ratio of a digital seismic system.

Referring to FIGS. 1 and 2A through 2E, format module provides pulse signal $E_1$, shown in FIG. 2A, to timing means 40 and to address means 43. It would be obvious to one skilled in the art that more than one signal is provided to the present invention. However, since those signals are related to whether the DFS system is acquiring data or setting instruments, they are not necessary to the understanding of the present invention and have been omitted for the sake of clarity.

Timing means 40 provides timing pulses $T_2$, $T_5$, $T_{10}$ and $T_{20}$, shown in FIGS. 2B through 2E, respectively.

The digital data signals from amplifier module 14, hereinafter referred to as signals $E_2$, are applied to a convention type storage register shown as new word register 48. Pulse $T_2$ from timing means 48 periodically enters digital signals $E_2$ into new word register 48. Hereafter the content of new word register 48 is referred to as the new word and the first new word entered into register 48 after a reset pulse provided by format module 16 is the initial word.

New word register 48 provided digital signals D to H and L register means 34 and to register control means 53.

H and L register means 34 includes a plurality of H and L register networks 200, one network 200 for each channel, of the type shown in detail in FIG. 3. The contents of the H and L registers are hereafter referred to as the H word and the L word, respectively. All elements in the H and L register network 200 have a 200 series designation.

Address means 43 provides signals $A_1$ through $A_{24}$ to the H and L register means 34, to transfer gates 39 and to transfer gates 58. For simplification of discussion, only one channel of operation, channel No. 1, will be discussed with the realization that the discussion is equally applicable to all the channels. Signal $A_1$ activates or permits usage of all the elements for channel No. 1.

Register control means 53 receives an initial word signal IW, H signals and L signals from register means 34, for a particular channel, through transfer gates 39 and the D signals for that channel from new word register 48. All elements in register control means 53 have a 100 series designation. Register control means 53 provides an H enable signal, an L enable signal, and a polarity signal for that channel to H and L register means 34 through transfer gates 58, as hereinafter explained. Register control means 53 controls H and L register means 34 so that the initial word for each channel is entered into corresponding H and L registers.

After the initial word has been entered in the H and L registers for a particular channel, H and L register means 34 is controlled to enter a new word into corresponding H register when the new word is greater in absolute value than the H word and into the corresponding L register when the new word is lesser in absolute value than the L word until the new word differs in polarity than the H and L words. When the new word differs in polarity from the H and L words, the new word is entered into the L register. Thereafter, register control means 53 will cause a new word to be entered in a register in which the register word has the same polarity as the new word and has an absolute value less than the absolute value of the new word.

The H and L words for a channel are also provided by transfer gates 39 to subtractor means 64 which provides a signal-to-noise output corresponding to the algebraic difference in decibels between the H word and L word. The output from subtractor means 64 is displayed by display means 65.

ENTRY OF INITIAL WORD INTO H and L REGISTER

Figure 4:
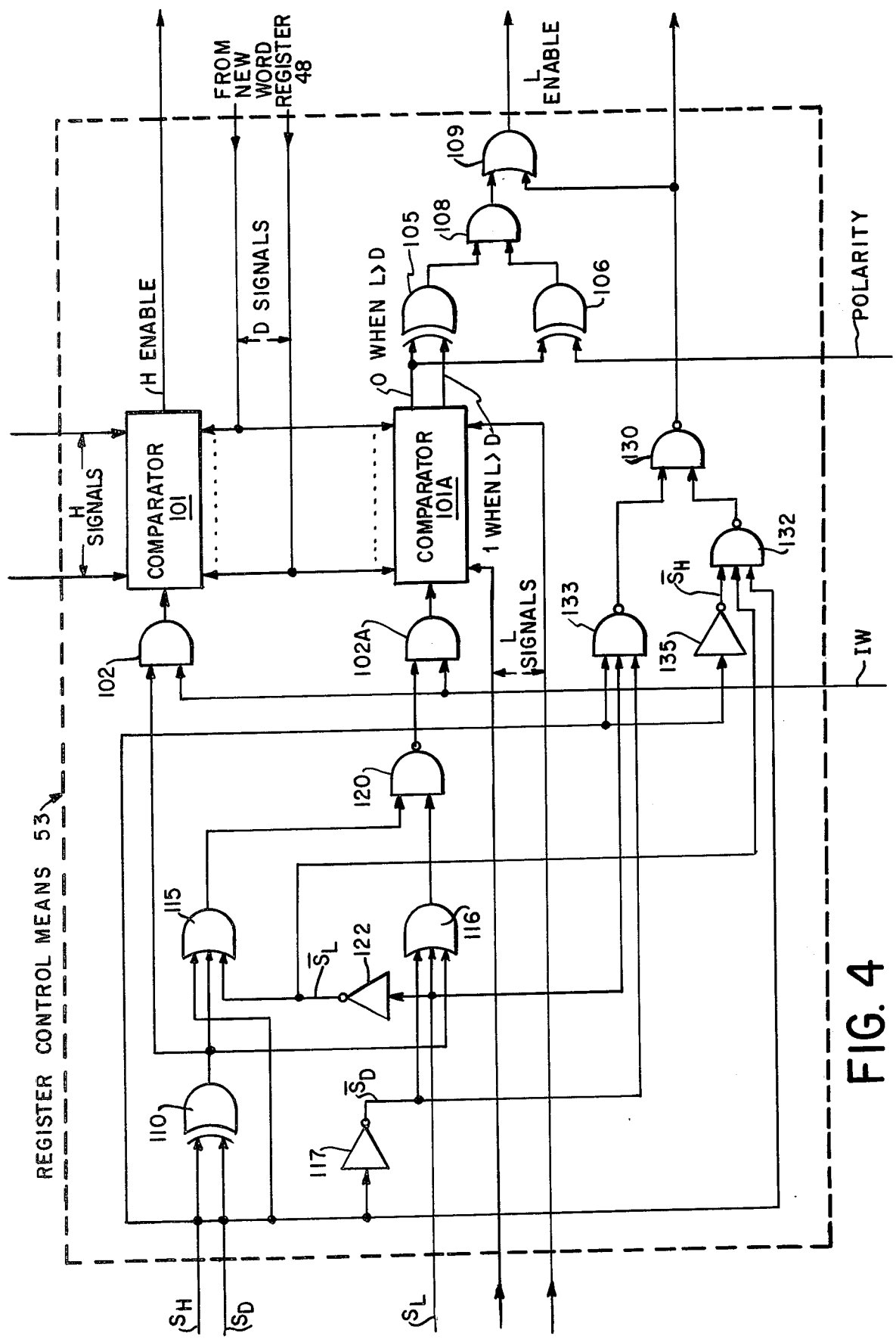
FIG. 4 is a detailed block diagram of the register control means shown in FIG. 1.

Referring to FIGS. 1, 3 and 4, an H and L register network 200 includes an H register 220 and an L register 218 which initialy have a zero content due to the previous reset pulse which reset them to zero. An initial word flip-flop 204 is in clear state due to a previous reset pulse until the first T20 pulse from timing means 40 causes it to change to a set state. While in the clear state, the $\overline{Q}$ output of flip flop 204 provides the initial word signal IW at a high logic level. Signal IW is provided at a high logic level when flip-flop 204 is in the set state. Flip-flop 204 remains in the set state until the next reset pulse.

As can be seen from FIGS. 2A through 2E, the first timing pulse T10 occurs before the first timing pulse T20 occurs. Therefore signal IW is at a low logic level when the first timing pulse T10 occurs. The effect of signal IW being at a low level is to cause AND gates 102, 102A in register control means 53 (FIG. 4) to provide a low level output to comparators 101 and 101A, respectively, thereby enabling them.

Comparator 101 compares the stored H signals from H register 220 with the data signals from new word register 48. Comparator 101 provides the 'H enable' signal at a high logic level when the comparison of the data signals with the H signals determine that data signals correspond to a greater absolute value than the H signals. The H enable signal is provided at a low logic level when the data signals do not correspond to a greater absolute value than the H signals. Thus, when the first timing pulse T10 occurs, comparator 101 provides the H enble signal at a high logic level.

The high level H enable signal enables a NAND gate 221 in H and L register network 200 along with a high level address signal A1 from address means 43. The enabled NAND gate 221 provides a negative pulse to H register 220 in response to a T10 pulse causing H register 220 to store the data signals and the sign signal SD and to provide the stored signals as the H signals and the stored sign signal as sign signal $S_H$.

Similarly, comparator 101A in register control means 53 compares the data signals from new word register 48 with the L signals from L register 218 and register network 200. Comparator 101A provides a first signal and a second signal corresponding to the comparison. It will be appreciated that comparator 101 could provide two signals, however only one signal was necessary and thus only one signal is shown being provided by comparator 101. When the data signals correspond to a greater absolute value than the L signals, comparator 101A provides the first and second signals at a low logic level and a high logic level, respectively, to an exclusive OR gate 105. Comparator 101A also provides the second signal to another Exclusive OR gate 106 which also receives a polarity signal from polarity flip-flop 205 in H and L register network 200. At the time of the first occurrence of timing pulse T10, flip-flop 205 is in a clear state and provides the polarity signal at a low logic level. When in a set state, flip-flop 205 will provide the polarity signal at a high logic level.

Since both Exclusive OR gates 105, 106 are each receiving a high logic level signal and a low logic level signal, Exclusive OR gates 105, 106 provide high logic level outputs to AND gate 108. AND gate 108, in response to the high level signals, provides a high level signal to OR gate 109 causing Or gate 109 to provide the 'L enable' signal at a high logic level. The high level L enable signal along with the high level A1 signal enables NAND gate 222 so that the occurrence of the first timing pulse T10 causes NAND gate 222 to provide a negative pulse to L register 218 causing it to store the data signals and the data sign signal $S_D$. Register 218 provides the stored signals as the L signals and the stored sign signal as signal $S_L$.

The first timing pulse T20 to initial word flip-flop 204 causes it to change to the set state, signal IW is then provided at a high logic level. With signal IW at a high logic level, AND gates 102, 102A are controlled, until reset pulse occurs, as hereinafter explained.

ENTRY OF A WORD, OTHER THAN THE INITIAL WORD, INTO THE H REGISTER

Signal $S_H$ for a particular channel from transfer gates 39 is applied to an Exclusive OR gate 110 along with signal $S_D$ from new word register 48. The output from Exclusive OR gate 110 is applied to an AND gate 102. Since the new word is not an initial word, signal IW is at a high logic level so that AND gate 102 is effectively controlled by the output from Exclusive OR gate 110. When signals $S_H$ and $S_O$ have the same logic level, i.e., the new word and the H word have the same polarity, Exclusive OR gate 110 provides a low logic level output causing AND gate 102 to provide a low level signal to comparator 101 enabling it to compare the H signals with the D signals. The new word is entered in H register 220 only when the new word has a greater absolute value than the stored H word as previously mentioned.

When signals $S_H$, $S_D$ have different logic levels, Exclusive OR gate 110 provides a high logic level output which causes AND gate 102 to provide a high logic level output. AND gate 102 high logic level output prevents comparator 101 from making a comparison so that the H enable signal is at a low level. Thus, the new word cannot be entered in H register 220.

ENTRY OF A DATA WORD, OTHER THAN THE INITIAL WORD, INTO THE L REGISTER

A new word is entered into L register 218 when the new word, the L word and the H word have the same polarity and the new word has an absolute value less than the absolute value of the L word. A new word will also be entered in L register 218 when the new word has a different polarity than the H word and the L word. Further, a new word will be entered into L register 218 when the new word and the L word have the same polarity while the H word has a different polarity and the new word has a greater absolute value than the L word.

When the new word, the L word and the H word have the same polarity, signals $S_D$, $S_L$ and $S_D$ have the same logic levels. Normally this situation occurs from the time of the initial word changes until the new word changes polarity. At that time the new word is entered in L register 218 and thereafter the H word and the L word will have different polarities. When $S_D$, $S_L$, $S_H$ have a high logic level, OR gate 115 passes signal $S_D$ to NAND gate 120 while OR gate 116 passes signal $S_L$ to NAND gate 120. Since $S_D$ and $S_L$ are both high, NAND gate 120 provides a low level output causing AND gate 102A to enable comparator 101A to make a comparison. The first and second signals from comparator 101A will be at a high logic level and a low logic level, respectively, when the new word has a greater absolute value than the L word.

Polarity flip-flop 205 is not triggered until the next subsequent new word after the condition where signals $S_H$, $S_L$ have a different logic level than signal $S_D$. Thus, the polarity signal is at a high level for the present condition. Since the first signal from comparator 101A and the polarity signal are at high levels, Exclusive OR gate 106 provides a low level signal to AND gate 108 causing it to provide a low level output. For reasons hereinafter explained, NAND gate 130 is providing a low logic level output. As a result, OR gate 109 provides the L enable signal at a low level so that the new word is not entered into L register 218.

However, when the new word has an absolute value less than the L word, comparator 101A provides the first and second signals at a low level and a high level, respectively. Exclusive OR gate 105 provides a high level output to AND gate 108 when a comparison is being made. Exclusive OR gate 106 now provides a high level signal to AND gate 108 since comparator 101A first signal and the polarity signal are at a low level and a high level, respectively, Exclusive OR gate 106 provides a high level signal causing AND gate 108 to provide a high level output. The high level output from AND gate 108 causes OR gate 109 to provide the L enable signal at a high level so that L register 218 accepts and stores the new word as the L word.

The second relation is readily determined as follows. When signals $S_H$, $S_L$ have a high logic level while signal $S_D$ is at a low logic level, NAND gate 133 provides a low level output causing NAND gate 130 to provide a high level output to OR gate 109. OR gate 109 provides the high logic level signal from NAND gate 130 as the L enable signal causing L register 218 to enter the new word. Similarly, when signals $S_H$, $S_L$ have a low logic level while signal $S_O$ has a high logic level, NAND gate 132 provides a low level output causing NAND gate 130 to provide a high level output. As previously mentioned, OR gate 109 provides a high logic level L enable signal when NAND gate 130 provides a high logic level output.

When the L and H words have different polarities for the first time, the polarity of the new word will agree with one of them, however, the output of NAND gate 130 will change from a low to a high level, which is inverted by inverter 225, triggering polarity flip-flop 205 to a set state. Flip-flop 205 remains in the set state, providing the polarity signal at a low logic level, until it is reset by a reset pulse.

Thus for the third condition, signals $S_D$, $S_L$ may be at a high logic level while signal $S_H$ is at a low logic level. OR gate 115 provides a high level output to NAND gate 120 in response to signal $S_D$. OR gate 116 also provides a high level output to NAND gate 120 in response to signal $S_L$ so that NAND gate 120 provides a low level output. AND gate 102A enables comparator 101A to compare the data signals with the L signals in response to NAND gate 120 low level output.

Comparator 101A is similarly enabled when signals $S_D$, $S_L$ are at a low logic level while signal $S_H$ is at a high logic level. Exclusive OR gate 110 provides a high level signal due signals $S_H$, $S_D$ being at different logic levels which cases OR gates 115, 116 to provide high logic level signals. NAND gate 120 disables AND gate 102A, in response to the signals from OR gates 115 and 116, causing AND gate 102A to enable comparator 101A.

Since the polarities of the data word and the L word differ from the H word, it is desirous to enter the data word into L register 218 when the absolute value of the new word is greater than the absolute value of the L word. Up until now, however, OR gate 109 provided a high level L enable signal, when the L word had an absolute value less than the absolute value of the new word. The change is accomplished with the polarity signal. During any comparison Exclusive OR gate 105 provided a high logic level output due to the first and second signals from comparator 101A being at different logic levels. However, the polarity signal is now at a low level so that Exclusive OR gate 106 provides a high level output when the first signal from comparator 101A is at a high logic level which occurs when the L word is not greater than the new word.

The high level outputs from Exclusive OR gates 105, 106 cause AND gate 108 to provide a high level signal to OR gate 109. OR gate 109 in turn provides the L enable signal at a high level. Thus when timing pulse T10 occurs, the new word is entered into L register 218.

The invention as herein described is an improvement to the seismic system which permits on-site determination of the signal to noise ratio of the seismic system. The digital signals corresponding to noise are periodically sampled. Storing means continually monitored the samples and stores the most positive and the most negative sample with respect to the samples. The absolute difference between the most positive stored sample and the most negative stored sample is then processed to provide an output corresponding to the signal to noise ratio.

What is claimed is:

1. An improvement to a seismic system, which provides a data word having digital signals corresponding to sensed vibrations in an earth formation or to noise occurring in the seismic system, for determining the signal-to-noise ratio of the seismic system when the digital signals correspond to the noise, the data word digital signals including a sign bit corresponding to a positive or a negative polarity of the data word while the remaining data word digital signals correspond to the absolute value of the sensed vibrations or the noise, said improvement comprising sampling means connected to the seismic system for periodically sampling the data word provided by the seismic system to provide a new word for each sampling; means connected to the sampling means for storing the most positive new word, with respect to the new words provided by the sampling means, as an H word, and the most negative new word, with respect to the new words provided by the sampling means, as an L word; and means connected to the storing means for providing a digital output corresponding to the absolute difference between the H word and the L word.

2. An improvement as described in claim 1 further comprising timing means for providing sampling pulses and enter pulses; and in which the sampling means includes a new word register connected to the seismic system, to the storing means and to the timing means and responsive to each sampling pulse for entering the data word signals and providing new word digital signals to the storing means corresponding to the entered data word until the next sampling pulse, 3. An improvement as described in claim 2 in which the storing means includes H register means connected to the new word register and to the output means for storing the new word digital signals when the new word has an absolute value greater in one polarity direction than the presently stored H word and providing H word digital signals corresponding to the stored H word to the output means, and L register means connected to the new word register and to the output means for storing the new word digital signals when the new word has an absolute value which is greater than the presently stored L word in an opposite polarity direction and providing L word digital signals.

4. An improvement as described in claim 3 in which the H register means includes H switching means connected to the timing means and receiving an H enable control signal for passing the 'enter2 pulses from the timing means when the H enable signal is at a high logic level and for blocking the enter pulses from the timing means when the H enable signal is at a low logic level, and a H register connected to the new word register and to the H switching means for entering the new word digital signals into the H register in response to a passed 'enter' pulse from the H switching means and for not entering the new word digital signals into the H register when the H switching means does not pass an enter pulse; and the L register means includes L switching means connected to the timing means and receiving an L enable signal for passing the enter pulses from the timing means when the L enable signal is at a high logic level and for blocking the enter pulses from timing means when the L enable signal is at a low logic level, and an L register connected to the new word register and to the L switching means for entering the new word digital signals into the L register in response to a passed enter pulse from the L switching means and for not entering the new word digital signals into the L register when the L switching means does not pass an enter pulse; and the storing means further includes signal means connected to the H and L switching means, to the new word register, to the H register and to the L register for providing the H enable signal to the H switching means at a high logic level when the new word has the same polarity as the H word and has a greater absolute value than the H word; for providing the H enable signal to the H switching means at a los logic level when the new word does not have the same polarity as the H word or when the new word does not have a greater absolute value than the new word; for providing in the L enable signal to the L switching means at a high logic level when the new word, the H word and the L word have the same polarity and the L word has a lesser absolute value than the new word, or when the new word and the L word have a different polarity than the H word and the L word has a greater absolute value than the new word; and for providing the L enable signal to the L switching means at a low logic level when the polarities of the new word and the L word differ, or when the polarities of the new word, the H and the L word are the same and the L word does not have a lesser absolute value than the new word, or when the new word and the L word have a polarity that is different from the polarity of the H word and the L word does not have a greater absolute value than the new word.

5. An improvement as described in claim 4 in which the seismic system periodically provides a reset pulse, and the storing means further includes initial word signal means connected to the seismic system and to the timing means for providing an initial word signal at a low logic level after the occurrence of a reset pulse and until just prior to the occurrence of a second enter pulse from the timing means after the occurrence of the reset pulse and for providing the initial word signal at a high logic level thereafter until the occurrence of another reset pulse, and the signal means provide the H enable and the L enable signals at a high logic level, to the H and the L switching means, respectively, in response to the initial word signal being at one high logic level so as to cause the new word occurring after the reset pulse to be entered into the H register and the L register as an initial word.

6. An improvement as described in claim 5 in which the signal means includes a first Exclusive OR gate connected to the H register and to the new word register and provides an output at a high logic level when one of the sign signals, corresponding to the polarity of the H word and the new word, from the H register or the new word register is at a high logic level but not both sign signals; a first AND gate connected to the first Exclusive Or gate and receiving the initial word signal to provide a high logic level output when the output from the Exclusive OR gate is at a high level and the initial word signal is at a high logic level and to provide a low level output when either the output from the first Exclusive OR gate or the initial word signal or both are at a low logic level; and first comparator means connected to the H register to the new word register, to the first AND gate and to the H switching means for comparing the H word digital signals from the H register with the new word digital signals from the new word register when the output from the first AND gate is at a low logic level, for not comparing the H word digital signals from the H register with the new word digital signals from the new word register when the output from the first AND gate is at a high logic level, for providing the H enable signal at a high logic level when the H word digital signals from the H register corresponds to a greater absolute value than the new word digital signals from the new word register and for providing the H enable signal at a low logic level when the H word digital signals from the H register do not correspond to a greater absolute value than the new word signals from the new word register.

7. An improvement as described in claim 6 in which the signal means further includes a first logic network means connected to the new and to the H and L registers and responsive to the sign signals from those registers corresponding to the polarity of the new word, the H word and the L word, for providing a low logic output when the polarity of the new word and the H word differ from the polarity of the L word and for providing a high logic level output when the polarity of the new word and the H word do not differ from the polarity of the L word, a second AND gate connected to the logic network means and to the initial word signal means for providing a high level output when the initial word signal and the output from the first logic network means are at a high logic level, and a low level output when the initial word control signal or the output from the logic network means is at a low level; second comparator means connected to the second AND gate, to the new word register and to the L register for comparing the new word with the L word digital signals when the output from the second AND gate is at a low logic level and for not comparing the L word digital signals from the L register with the new word digital signals from the new word register when the output from the AND gate is at a high logic level and providing a first signal and a second signal at a low logic level and a high logic level, respectively, when the L word is greater in absolute value than the new word and providing the first and second signals at a high logic level and a low logic level respectively when the absolute value of the L word is not greater than the new word; second logic network means connected to the H register, to the L register and to the new word register for providing a high logic level output in accordance with the sign signals from those registers when the polarity of the new word differs from the polarities of the H and L words and for providing a low logic level signal when the polarity of the new word does not differ from the polarities of the H and L words; and an OR gate connected to the second logic network means for passing a high level signal from the second network means as a high logic level L enable signal; and third logic network means connected to the second comparator means and to the second logic network means and to the OR gate for providing a high logic level signal when new word and the L word and H word have the same polarity and the new word has an absolute value less than the absolute value of the L word, or when the new word has the same polarity as the L word and the absolute value of the new word is greater than the absolute value of the L word, and providing a low level output when the new word and the L word do not have the same polarity or the new word does not have an absolute value less than the absolute value of the L word when the new word, the L word and the H word have the same polarity, or the new word does not have an absolute value greater than the absolute value of the L word when the polarity of the new word and the L word differ from the polarity of the H word, and the OR gate passes a high level output from the third logic network means as a high logic level L enable signal and the OR gate provides the L enable signal at a low logic level when the outputs from the second and third logic network means are at a low level.

8. An improvement to a seismic system having a plurality of channels which provides a data word having digital signals corresponding at different times to vibrations sensed in an earth formation by a corresponding channel or to noise occurring in that channel of the seismic system, for determining the signal-to-noise ratio of each channel of the seismic system when the digital signals correspond to the noise, the data word digital signals including a sign bit corresponding to a positive or a negative polarity of the data word while the remaining data word digital signals correspond to the absolute value of the sensed vibrations or the noise for a channel, said improvement comprising a plurality of storing means, each storing means stores the most positive new word, with respect to the new words provided to it, as an H word for a corresponding channel, and the most negative new word, with respect to the new words provided to its, as an L word for the corresponding channel; multiplexing signal means controlled by the seismic system for providing multiplexing signals; first multiplex switching means connected to the multiplexing signal means, to the sampling means and to the plurality of storing means for providing the new words from the sampling means to the storing means in a manner so that each storing means receives new words associated with a corresponding channel; a plurality of means for providing displays, each display means displaying the absolute difference between the H word and the L word for a corresponding channel in accordance with the H word and L word provided to it; and second multiplex switching means connected to the multiplexing signal means, to all the storing means and to all the display means for providing the H words and L words from the storing means to the display means in accordance with the multiplexing signals in a manner so that each display means receives the H words and the L words associated with a corresponding channel.

9. An improvement as described in claim 8 further comprising timing means for providing sampling pulses and enter pulses; and in which the sampling means includes a new word register connected to the seismic system, to the first multiplex switching means and to the timing means and responsive to each sampling pulse for entering the data word signals and providing new word digital signals to the first multiplex switching means corresponding to the entered data word until the next sampling pulse.

10. An improvement as described in claim 9 in which each storing means includes H register means connected to the first and second multiplex switching means for storing the new word digital signals provided to it by the first multiplex switching means when the new word for its corresponding channel has an absolute value greater in one polarity direction than the presently stored H word and providing H word digital signals corresponding to the stored H word to the second multiplex switching means, and L register means connected to the first and second multiplex switching meaans for storing the new word digital signals provided to it by the first multiplex switching means when the new word for its corresponding channel has an absolute value which is greater in an opposite polarity direction than the presently stored L word and providing L word digital signals to the second multiplex switching means.

* * * * *